United States Patent

Price et al.

[11] Patent Number: 5,902,043
[45] Date of Patent: May 11, 1999

[54] APPARATUS AND METHOD FOR MEASURING HEAT POWER CONSUMED IN OR EXTRACTED FROM A REGION

[75] Inventors: Barry Leonard Price, Quorn; Graham Richard Roberts, Stratford Upon Avon; David Richard Wightman, Ibstock, all of United Kingdom

[73] Assignee: British Gas plc, London, United Kingdom

[21] Appl. No.: 08/666,476

[22] PCT Filed: Nov. 3, 1995

[86] PCT No.: PCT/GB95/02595

§ 371 Date: Jul. 2, 1996

§ 102(e) Date: Jul. 2, 1996

[87] PCT Pub. No.: WO96/14560

PCT Pub. Date: May 17, 1996

[30] Foreign Application Priority Data

Nov. 7, 1994 [GB] United Kingdom ................... 9422452

[51] Int. Cl.$^6$ ........................... G01K 17/08; G01K 19/00
[52] U.S. Cl. .................................. 374/39; 374/33; 374/1
[58] Field of Search ........................................ 374/39, 33

[56] References Cited

U.S. PATENT DOCUMENTS

| | | | |
|---|---|---|---|
| 3,167,957 | 2/1965 | Ziviani | 374/39 |
| 4,085,613 | 4/1978 | Richard | 374/39 |
| 4,355,908 | 10/1982 | Weisser et al. | 374/39 |
| 4,362,404 | 12/1982 | Armstrong | 374/39 |
| 4,440,507 | 4/1984 | Karras et al. | 374/39 |
| 4,448,545 | 5/1984 | Pelka et al. | 374/41 |
| 4,538,925 | 9/1985 | Zgonic | 374/39 |

FOREIGN PATENT DOCUMENTS

| | | | |
|---|---|---|---|
| 0626744 | 10/1961 | Italy | 374/39 |
| 0225192 | 4/1943 | Switzerland | 374/39 |

OTHER PUBLICATIONS

English Language Translation of German Unexamined Application No. 2,330,498 published Jan. 9, 1975.

*Primary Examiner*—Diego Gutierrez
*Attorney, Agent, or Firm*—Oblon, Spivak, McClelland, Maier & Neustadt, P.C.

[57] ABSTRACT

A heat meter for measuring the amount of heat consumed in a region. A heat exchanger is supplied with heated fluid through an inlet pipe which carries temperature sensors for sending signals to a control. The control also receives signals from a temperature sensor in an outlet pipe carrying fluid away from the region. A low power electric heater is mounted between the sensors to add a known amount of heat to the fluid. The control calculates the heat power consumed in the region based on the temperature difference across the regions and the temperature difference across the region and the temperature difference across the heater.

33 Claims, 4 Drawing Sheets

APPARATUS AND METHOD FOR MEASURING HEAT POWER CONSUMED IN OR EXTRACTED FROM A REGION

BACKGROUND OF THE INVENTION

1. Field of the Invention

This invention concerns heat metering, and in particular the invention concerns a method of measuring heat power consumed in a region from heat delivered thereto by a heat containing fluid and also concerns a heat meter to measure the heat power consumed in the region from heat delivered thereto by the fluid.

2. Discussion of the Background

The fluid may be a liquid, for example water. For example, in the case of water, the water may be the output from a heater such as a boiler, or be coolant bearing heat from apparatus it has been used to cool, or may be condensed steam, for example condensate subsequent to using the steam to drive a turbine.

The region comprises one or more heat exchangers. The region may be of any size. For example, the region may have single heat exchanger, for example a space heating radiator in a room. Or the region may comprise a plurality of heat exchangers forming, for example, a heat providing system for, for example a dwelling, a factory, a commercial office or public building, or a public amenity, or a plurality or combination of any of the aforesaid forming, for example, a community, village, town, suburb, district, or a commercial or industrial zone or district.

SUMMARY OF THE INVENTION

According to a first aspect of the invention, there is provided a method of measuring heat power consumed in a region from heat delivered thereto by a heat containing fluid passing along an input path to said region from which the fluid leaves along an output path from said region, the method comprising measuring a temperature difference value Dd between the temperature of the fluid at a first position in one of said paths and the temperature of the fluid at a second position in the other of said paths, adding heat of a heat power value Ph to the fluid at a location in a said path, said location being with respect to the direction of fluid flow in said paths and region downstream of one of said positions and upstream of the other of said positions, measuring a temperature difference value Dh between the temperature of the fluid adjacent to upstream and downstream extremities of said location which temperature difference Dh is a consequence of adding heat power of said value Ph to the fluid at said location, and calculating the heat power of a value Pd consumed by said region according to the expression:

$$Pd = Ph \times \frac{Dd}{Dh}$$

According to a second aspect of the invention, there is provided a heat meter to measure heat consumed in a region from heat delivered thereto by a heat containing fluid, said heat meter comprising a first or input path for passage of fluid therealong into said region when the region is connected to said input path, a second or output path for passage therealong of the fluid leaving said region when the region is connected to said output path, temperature difference observing means to observe a temperature difference value Dd between the temperature of the fluid at a first position in one of said paths and the temperature of the fluid at a second position in the other of said paths, heat adding means to add heat of a heat power value Ph to fluid in a said path at a location which, with respect to the direction of fluid flow in said paths and region when the paths are connected to the region, is downstream of one of said positions and upstream of the other of said positions, temperature difference observing means to observe a temperature difference value Dh between the temperature of the fluid adjacent to upstream and downstream extremities of said location and which temperature difference Dh is a consequence of adding heat power of said value Ph to the fluid at said location when the heat meter is in use, and calculating means to calculate the heat power Pd consumed by said region according to the expression:

$$Pd = Ph \times \frac{Dd}{Dh}$$

Heat power of the value Ph may be added to the fluid in one of said paths at a location which may be upstream or downstream of the region; i.e. the heat power of value Ph may be added to the fluid, either before the fluid enters the region or after the fluid has left the region.

The temperature difference observing means to observe the temperature difference Dd and the temperature difference observing means to observe the temperature difference Dh may comprise common temperature sensing means. For example, the temperature difference observing means to observe the temperature difference Dd may comprise first temperature sensing means to sense the temperature of the fluid in a said path and second temperature sensing means to sense the temperature of the fluid in the other said path, and the temperature difference observing means to observe the temperature difference Dh may comprise said first temperature sensing means to sense the temperature of the fluid adjacent to the said extremity of said location and third temperature sensing means to sense the temperature of the fluid adjacent to the other said extremity. When the heat power of value Ph is added to the fluid in said input path, the first temperature sensing means may sense the temperature of the fluid adjacent to the upstream extremity of said location. On the other hand, when the heat power of value Ph is added to the fluid in said output path, the first temperature sensing means may sense the temperature of the fluid adjacent to the downstream extremity of said location.

Alternatively, the temperature difference observing means to observe the temperature difference Dd may comprise a first temperature sensing means to sense the temperature of the fluid in the input path and second temperature sensing means to sense the temperature of the fluid in the output path. The temperature difference observing means to observe the temperature difference Dh may comprise third and fourth temperature sensing means to sense the temperature of the fluid adjacent to a respective one of said extremities. When the location at which the heat power of value Ph is added is in the input path, the third temperature sensing means may sense the temperature of the fluid upstream of said location and the fourth temperature sensing means may sense the temperature of the fluid downstream of the location, whereas when the location at which the heat power of value Ph is added is in the output path, the third temperature sensing means may sense the temperature of the fluid downstream of said location and the fourth temperature sensing means may sense the temperature of the fluid upstream of said location.

BRIEF DESCRIPTION OF THE DRAWINGS

The invention will now be further described, by way of example, with reference to the accompanying drawings in which:

FIG. 2.

DISCUSSION OF THE PREFERRED EMBODIMENTS

In the drawings like references refer to like or comparable parts.

Figure 1:
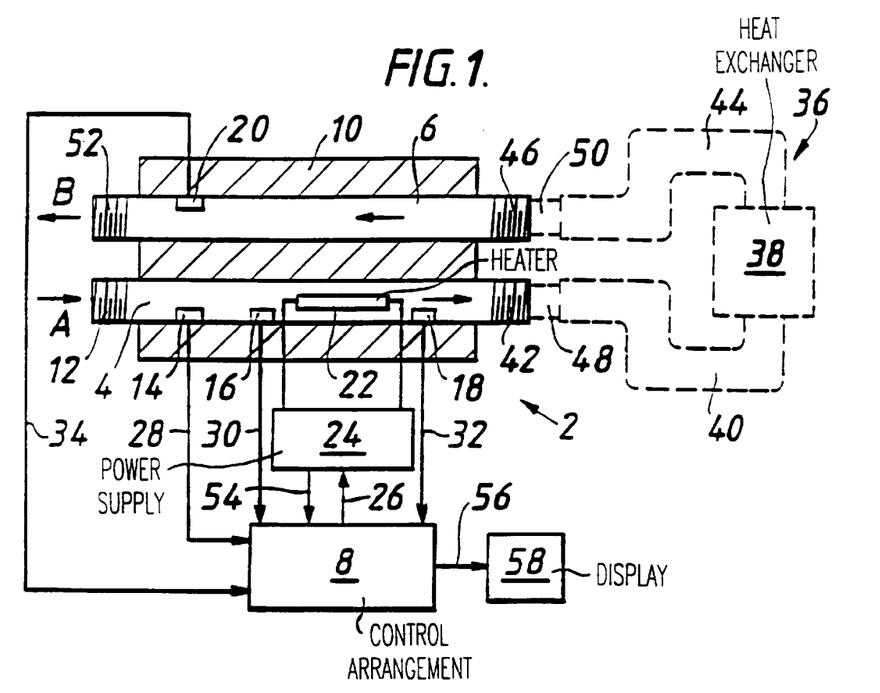
FIG. 1. shows diagrammatically, and partly in section, one embodiment of heat meter formed according to the second aspect of the invention and capable of performing the method according to the first aspect.

With reference to FIG. 1, a heat meter 2 comprises a fluid passage or pipe 4, (which in FIGS. 1 to 4 and 6 is an inlet pipe), a fluid passage or pipe 6, (which in FIGS. 1 to 4 and 6 is an outlet pipe), and a control arrangement 8. The pipes 4 and 6 are well heat insulated from one another and from the ambient atmosphere, for example, they may be formed through a block of good heat insulating material 10 or the insulation may be within an outer casing. It is desirable that heat losses from the pipes 4 and 6 be minimal.

Fluid is introduced into an end 12 (in FIG. 1 an inlet end) of the pipe 4 in the direction of arrow A.

A temperature sensor 14 is mounted in the pipe 4, and downstream of the sensor 14 are two further temperature sensors 16 and 18 spaced apart along pipe 4 by a short distance. Another temperature sensor 20 is mounted in pipe 6.

An electric heater 22 is mounted in the pipe 4 at a location between the temperature sensors 16 and 18 which are disposed adjacent to opposite ends or extremes of said location at which the heater adds heat to the fluid. The power Ph of the heater 22 in any appropriate units of power, for example watts, is known or can be calculated. Preferably the power of the heater 22 is relatively low, for example, about ten watts.

The heater 22 is provided with electrical power from a suitable electrical power supply 24 operated in response to signals on signal path 26 from the control arrangement 8.

The temperature sensors 14, 16, 18 and 20 are electrical or electronic devices providing signals, on signal paths 28, 30, 32 and 34 respectively, representative of the temperatures of the fluid they observe within the pipes 4 and 6; said signals being fed to the control arrangement 8 which may be electrical or electronic apparatus comprising computer means.

A heat consuming region 36 is connected to the heat meter 2. The region 36 comprises heat exchange means 38, which may be an heat exchanger or a plurality of heat exchangers, connected by a fluid input path 40 to an end 42 (in FIG. 1. an outlet end) of the pipe 4 and by a fluid output path 44 to an end 46 (in FIG. 1. an inlet end) of the pipe 6.

The pipe ends 42 and 46 can be internally screw threaded for securement thereto of threaded connectors 48 and 50 to the paths 40 and 44. The region 36 may be a room and the heat exchange means 38 may be one or more radiators, for example, providing space heating, or may be a heater of a water heater providing heated water, for example, for washing purposes or for process purposes, or the heat exchange means 38 may be a plurality of space heaters and/or water heaters in a dwelling or in a number of dwellings, or in factory, commercial or business buildings, public buildings or amenities. For example, the region may be a community, village, town, suburb, district, or a commercial or industrial zone or district.

Fluid, from a suitable fluid supply (not shown) where heat is added to said fluid is introduced into the inlet pipe 4 through the end 12, and after circulating through the region 36, the fluid leaves the pipe 6 in the direction of arrow B through an end 52 (in FIG. 1. an outlet end) for example, to return to said fluid supply. The ends 12 and 52 are internally screw threaded so that the pipe 4, at least, may be threadably connected with the fluid supply.

The fluid may be liquid, for example, water, and the fluid supply may be liquid heater or boiler means and/or apparatus cooling means in which the liquid acts as coolant extracting heat from said apparatus to be cooled.

Temperature sensor 14 observes the temperature value $T_i$ of the fluid after it has entered the pipe 4 and temperature sensor 16 observes the temperature value $t_1$ of the fluid just before it passes the heater 22. Temperature sensor 18 observes the temperature value $t_2$ of the fluid in the pipe 4 just after the fluid has passed the heater 22, and temperature sensor 20 observes the temperature value $T_o$ of the fluid in the pipe 6 after the fluid has passed through the region 36. The temperature values $T_i$, $T_o$, $t_1$ and $t_2$ are measured in the same appropriate units of temperature as desired, for example in degrees Kelvin, Celsius, Fahrenheit or whatever.

The heat power Pd (in the same units of power as the power Ph) consumed by the region 36 can be represented by the expression :

$$Pd = m \times C_v \times (T_i - T_o) \quad -(1)$$

where:

m is the mass flow rate of the fluid, and $C_v$ is the specific heat capacity of the fluid.

The temperature difference $t_2 - t_1$ between the temperature values observed by the temperature sensors 18 and 16 respectively, when the heater 22 is adding heat power of the value Ph to the fluid, can be represented by the expression:

$$t_2 - t_1 = \frac{Ph}{m \times C_v} \quad -(2)$$

By rearranging expression (2), we get:

$$m = \frac{Ph}{(t_2 - t_1) \times C_v} \quad -(3)$$

When the expression (3) is inserted in expression (1) we get:

$$Pd = Ph \times \frac{(T_i - T_o)}{(t_2 - t_1)}, \text{ or} \quad -(4)$$
$$Pd = Ph \times \frac{Dd}{Dh}$$

in which Dd is the temperature drop ($T_i - T_o$) across the region 36 (modified by the addition of a small amount of heat by the heater 22), and Dh is the temperature change ($t_2-t_1$) across the heater 22.

The control arrangement 8 is programmed or otherwise arranged to use the expression (4) above to calculate the heat power value Pd being consumed by the region 36 using the temperature values data input to the control arrangement from the temperature sensors 14, 16, 18 and 20. The control arrangement 8 can be arranged to assume that the power Ph of the electric heater 22 is a known value which remains constant, or the power supply 24 may be arranged to supply signals on a path 54 to the control arrangement, representing the instantaneous power of the heater or by which the control arrangement can calculate the heater power. For example, the power supply 24 may comprise electrical power consumed measuring means or the signals on path 54 may represent the voltage across the heater 22 and the electric current through the heater.

An advantage of the heat meter 2 described with reference to FIG. 1 is that it, or at least the arrangement of parts or components 4, 6, 10, 14, 16, 18, 20 and 22, has no moving parts. Another advantage is that the meter does not require the properties, such as density or specific heat capacity, of the fluid, to be known.

Preferably the sensors 16 and 18 measuring the temperatures $t_1$ and $t_2$ have a high resolution, for example an ability to measure in accurate small increments of, for example, 0.001° C.

The system may be operated in a manner which does not require the sensors 16 and 18 to make an accurate measurement of the actual temperatures to which they are subject as long as the value of the temperature difference $Dh=(t_2-t_1)$ is accurately known.

This may be achieved by periodically calibrating the sensors 16 and 18 with respect to one another. For example, the control arrangement 8 periodically causes the heater 22 to be switched off. Now that no heat is being added to the fluid in the pipe 4, the fluid opposite each sensor 16 and 18 is at the same temperature. Thus the temperature reading $t_1$ of temperature sensor 16 should have the same value as the temperature reading $t_2$ of temperature sensor 18, i.e. $t_1$ should equal $t_2$. But there may be a difference or error between the value $t_1$ and the value $t_2$ because the sensors 16 and 18 are not giving identical outputs, so that $t_1=t_2\pm e$. The control arrangement 8 subtracts $t_1$ from $t_2$ to give the error e which is +e if the value of $t_2$ is less than $t_1$ (the sensor 18 is reading low compared to sensor 16) and −e if the value of $t_2$ is greater than $t_1$ (the sensor 18 is reading high compared to sensor 16).

Next time the heater 22 is switched on and the temperature readings of sensors 16 and 18 are $t_1$ and $t_2$ respectively, then the control arrangement 8 calculates Dh the temperature change across the heater 22 as ($t_2-t_1+e$) when the sensor 18 is reading low and as ($t_2-t_1-e$) when sensor 18 is reading high. if desired, the control arrangement 8 may switch the heater on and off for equal periods of time, for example, substantially fifteen seconds, so that after each period of being on the control arrangement calibrates the temperature sensors 16 and 18.

The control arrangement 8 may integrate the successive calculated values Pd of heat consumed with respect to time and send signals on path 56 to a recorder and/or display means 58 to record and/or display the instantaneous heat power consumption and/or that consumed over a period of time. Also, the control arrangement 8 may have cost data input thereto so that it may calculate the money cost of heat power consumed over a period and/or the money rate at which heat power is being consumed, and this cost and/or rate may be recorded and/or displayed by the recorder and/or display means 58.

Figure 2:
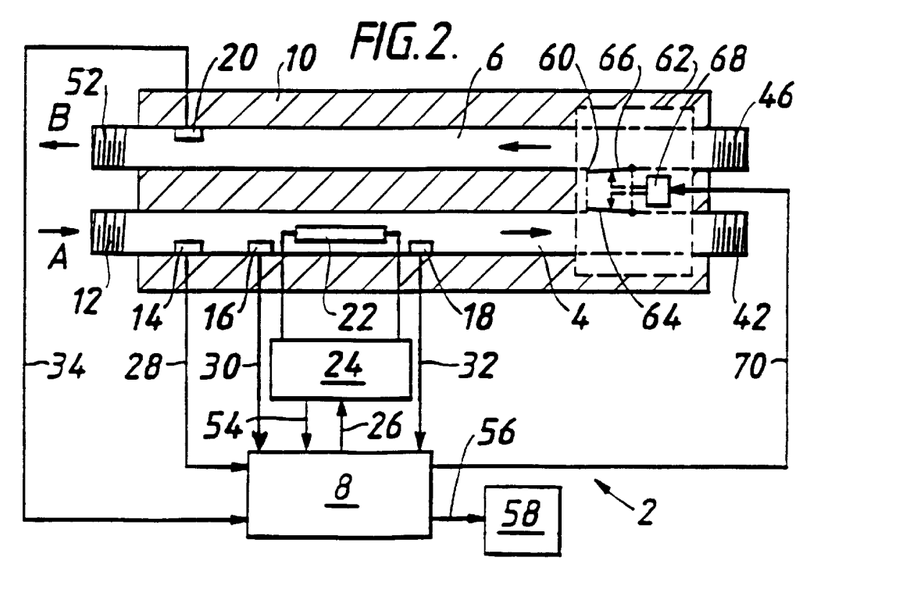
FIG. 2. shows diagrammatically, and partly in section, a modification of the heat meter in FIG. 1 comprising a valve arrangement between the input and output paths.
Figure 3:
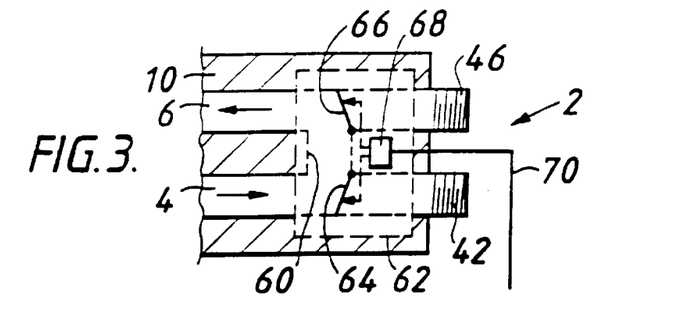
FIG. 3. shows diagrammatically, and partly in section, a fragment of the heat meter in FIG. 2 with the valve arrangement in a different attitude.

In the modification shown in FIGS. 2 and 3, a by-pass passage 60 links the pipes 4 and 6 adjacent to their respective ends 42 and 46 whereby the fluid may, when desired, short circuit or by-pass the region which is shown at 36 in FIG. 1.

A three-way valve arrangement 62 is provided to alternately block the passage 60 or open the passage 60 and block the pipes 4 and 6 adjacent to the ends 42 and 46. The valve arrangement 62 is diagrammatically represented as having valve member means comprising two flap-valve members 64 and 66 closing off the passage 60 in FIG. 2. Thus fluid is supplied through pipe 4 to the region as described with reference to FIG. 1, and returns from the region through pipe 6. The valve arrangement 62 also comprises motor means 68 driving the valve member means 64, 66 between first and second positions; in one position the passage 60 is closed and the pipes 4 and 6 are open as represented in FIG. 2, in the second position the valve member means 64, 66 opens the passage 60 and closes the ends 42 and 46 of the pipes 4 and 6 as represented in FIG. 3. The motor means 68 responds to signals (on signal path 70) from the control arrangement 8 to operate the valve arrangement 62 to close the passage 60, or open the passage 60 and close the pipe ends 42 and 46, as desired.

Normally the valve arrangement 62 closes the passage 60 (as in FIG. 2), but periodically, for example once in each period of twenty-four hours, the control arrangement 8 operates the valve arrangement 62 to change to said second position to open the path 60 and close the pipe ends 42 and 46 (as represented in FIG. 3) for a short time. This is done while the heater 22 is also switched off, preferably while the temperature sensors 16 and 18 are being calibrated. Because the fluid is by-passing the region (36 in FIG. 1.), the temperatures the fluid exhibits at the temperature sensors 14 and 20 are the same, thus in like manner to temperature sensors 16 and 18, the control arrangement can calibrate the temperature sensors 14 and 20 so that the temperature difference $Dd=(T_i-T_o)$ can be accurately calculated when the heat meter 2 is calculating the heat power Pd consumed. When the calibration of the temperature sensors 14 and 20 is completed, the control arrangement 8 actuates the valve arrangement 62 to open the pipes 4, 6 and close the passage 60.

In the embodiment of the heat meter 2 in FIG. 4 which may include a passage joining the pipes 4 and 6 controlled by a valve arrangement 62, as described with reference to FIGS. 2 and 3, the pipes 4 and 6 are formed with elbow or right-angle bends 72 and 74 respectively, the bend 72 in the pipe 4 being in a venturi throat 76 of a venturi 78 in the pipe 4. The venturi 78 also comprises a converging portion 80 adjacent which is the temperature sensor 16 and a diverging portion 82 adjacent which is the temperature sensor 18. The electric heater 22 is in the throat 76 and extends round the bend 72. In this embodiment, the speed of fluid flow increases through the venturi 78 and thus reduces the thickness of the boundary layer of fluid on the inner wall of the throat 76 which, coupled with the turbulence in the fluid caused by the flow round the bend 72, means there is improved heat transfer to the fluid from the heater 22.

Figure 4:
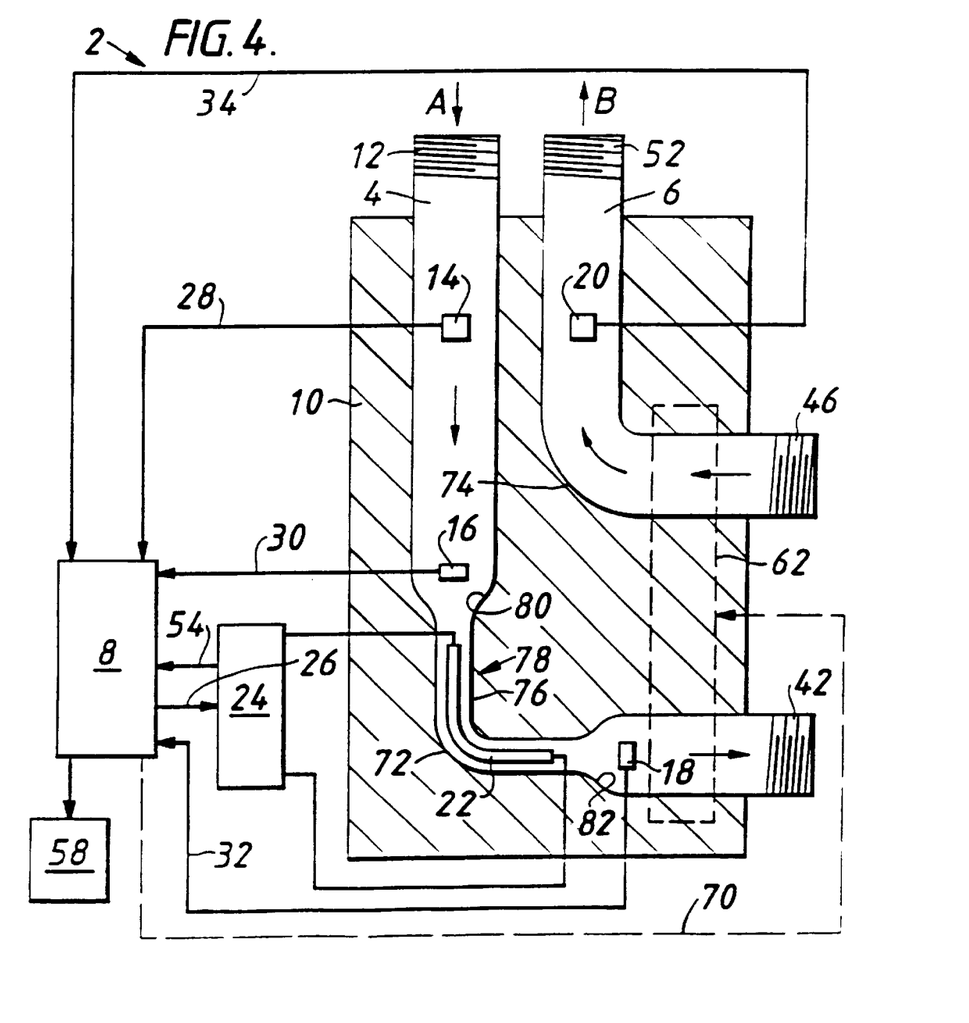
FIG. 4. shows diagrammatically, and partly in section, another embodiment of heat meter formed according to the second aspect of the invention and capable of performing the method according to the first aspect.

Because the temperature sensors 14 and 20 in the embodiment in FIGS. 2 to 4 can be calibrated with respect to one another using the valve arrangement 62 as described, the sensors 14 and 20 need not be capable of accurately measuring the actual temperature to which they are subjected, provided the temperature difference $Dd=(T_i-T_o)$ is accurately known preferably to, say, 0.1° C. or its equivalent in another temperature scale.

However, in the embodiment in FIG. 1 the temperature sensors 14 and 20 cannot be calibrated, as described with reference to FIGS. 2 and 3, so the sensors 14 and 20 should be reliable and capable of measuring the temperature accurately in, for example, increments of say 0.1° C. In FIG. 1 the temperature sensors 14 and 20 may be quartz crystal sensors, which can be expensive.

Figure 5:
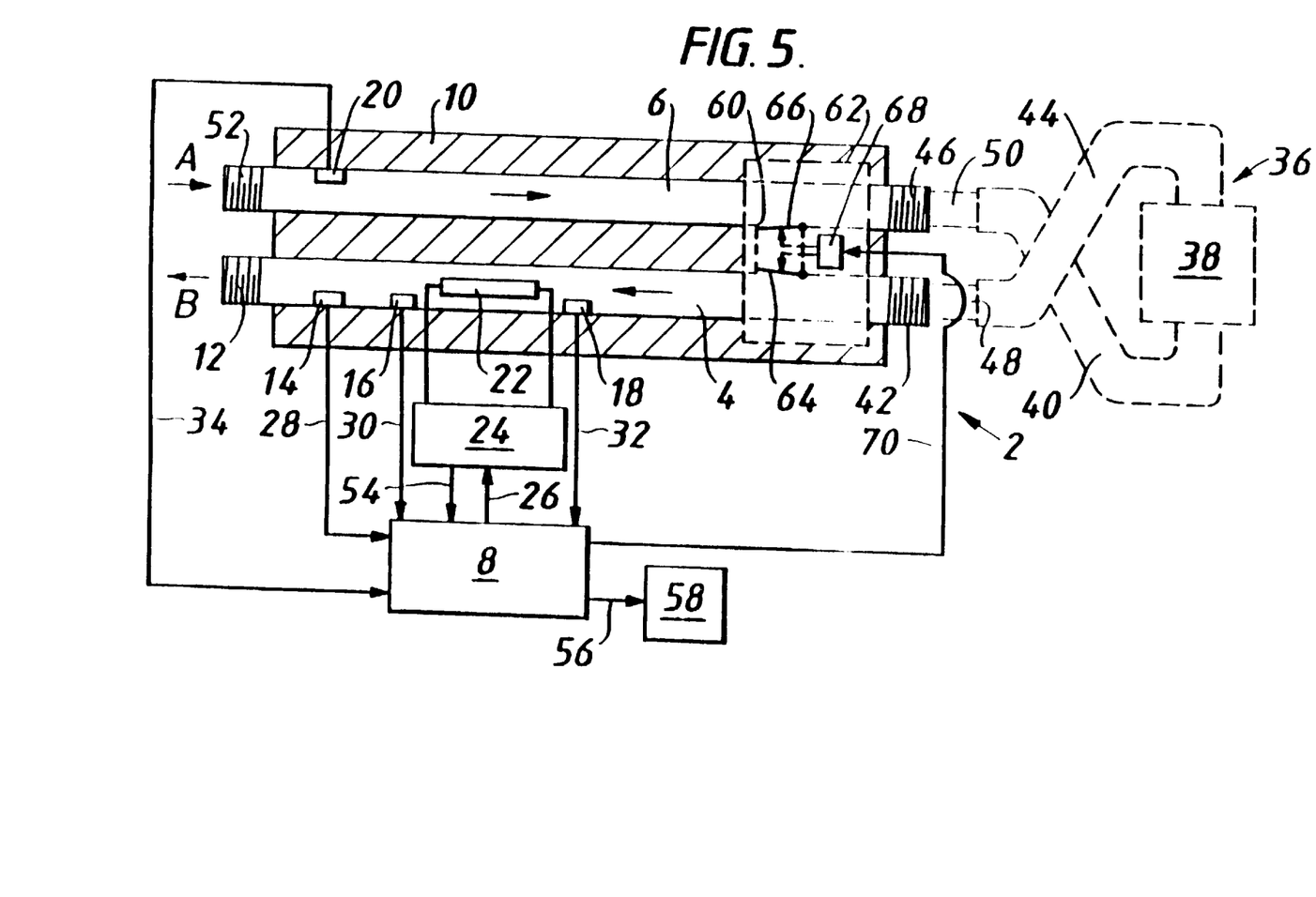
FIG. 5. shows the heat meter in FIG. 2 so connected to the region that the fluid flow through the meter is in the reverse direction to that in FIG. 2., but the meter is still capable of performing the method according to the first aspect of the invention, and FIG. 6. shows diagrammatically, and partly in section, a modification of the heat meter in FIG. 1.

In the arrangement in FIG. 5, fluid flowing in the direction of arrow A, is introduced into the pipe 6 through its end 52 (the pipe 6 is now the inlet pipe) and leaves through its end 46 to go through the region 36 via the fluid input path 40. The fluid leaves the region 36 through the fluid output path 44 connected to the end 42 of the pipe 4 (the pipe 4 is now the outlet pipe), from which the fluid leaves in the direction of the arrow B, through the pipe end 12. Thus the flow of fluid through the heat meter 2, in FIG. 5, is in the reverse direction to that through the meter in FIGS. 1 to 4.

In FIG. 5 the heater 22 adds heat power of value Ph to the fluid after the fluid has left the region 36. The sensor 20 observes the temperature $T_i$ and the sensor 14 observes the temperature $T_j$. Temperature sensor 18 observes the temperature $T_i$ and is upstream of the heater 22. Temperature sensor 16 observes the temperature $t_2$ and is downstream of the heater 22 and upstream of the sensor 14. The temperature difference $Dd=(T_i-T_o)$ can be calculated in the control arrangement 8 as can the temperature difference $Dh=(t_2-t_1)$. However, the control arrangement 8 may handle the signals from paths 28, 30, 32 and 34 (in FIG. 5) in the same manner as it did in FIGS. 1 to 4, in which case Dd is calculated in FIG. 5 as $(T_o-T_i)$ and Dh as $(t_1-t_2)$ giving each of Dd and Dh a negative value. But that does not matter because, in the expression (4) above:

$$\frac{-Dd}{-Dh} \text{ becomes } \frac{Dd}{Dh}.$$

Figure 6:
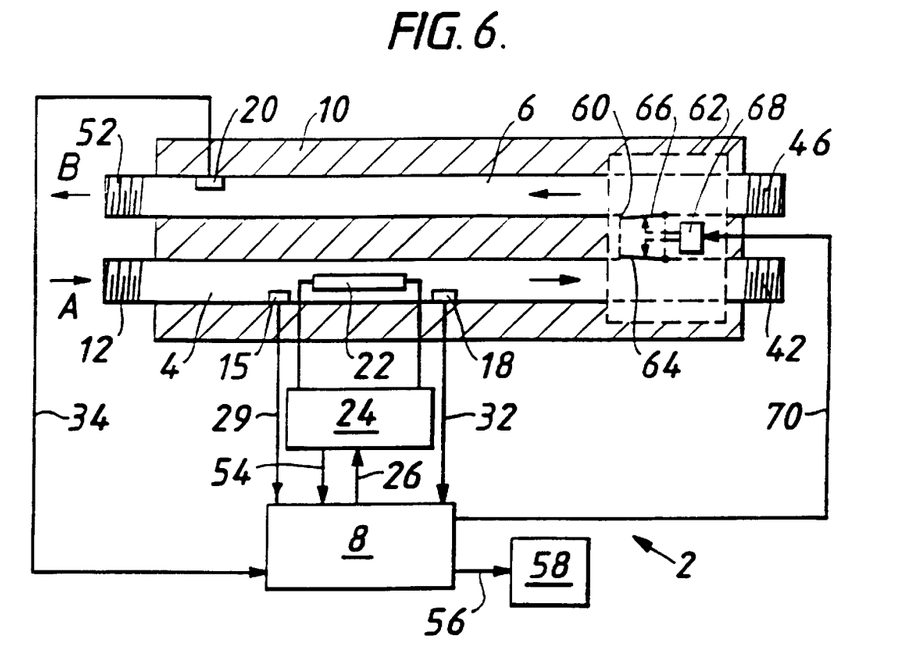

In the modification illustrated in FIG. 6 the two temperature sensors 14 and 16 in FIGS. 1 to 5 are replaced by a single temperature sensor 15 connected with the control arrangement 8 by a signal path 29. The sensor 15 is mounted adjacent to an extremity or end of the location at which the heater 22 is mounted, which in FIG. 6 is an upstream extremity of the location having regard to the direction of fluid flow in the pipe 4 which is in the same direction as in FIGS. 1 to 4. The sensor 15 observes the fluid temperature having the value $T_i$ and $t_1$, so it is clear that $T_i=t_1$, which is also actually the case in FIGS. 1 to 4. Because the sensor 15 is common to the two systems providing the temperature difference values Dd and Dh for the calculation using expression (4) above, it is preferred that the sensors 18 and 20 be calibrated against the common sensor 15.

It will also be appreciated that in the heat meter 2 in FIG. 6, the flow of fluid therethrough can be reversed (as in FIG. 5) so that the fluid input into the meter from the fluid supply is through the pipe end 52 so that pipe 6 is an inlet pipe and pipe 4 becomes an outlet pipe from which the fluid leaves the meter through the pipe end 12.

In a modification of the heat metering described above, the heat meter 2 can be used to measure the heat power of value Pd extracted by the fluid from the zone 36 in which the heat exchange means 38 is arranged to absorb heat from the zone so as to have a cooling effect on the zone. In this case the fluid flowing along the input path in direction A may be initially cooled or chilled before entering the path, and when the fluid leaves the zone 36 and flows along the output path in the direction B that fluid is likely to be warmer than that entering the input path.

What is claimed is

1. A method of measuring heat power consumed in a region from heat delivered thereto by a heat containing fluid passing along an input path to said region, the fluid leaving from said region along an output path, the method comprising:

measuring a temperature difference value Dd between a temperature of the fluid at a first position in one of said paths and a temperature of the fluid at a second position in the other of said paths;

adding heat of a heat power value Ph to the fluid at a location in one of said paths, said location being, with respect to a direction of fluid flow in said paths and through the region, downstream of one of said positions and upstream of the other of said positions;

measuring a temperature of the fluid adjacent to an upstream end of said location using an upstream temperature sensor and downstream end of said location using a downstream temperature sensor;

finding a temperature difference value Dh as a function of the temperature difference between the measured temperatures of the upstream and the downstream end of said location corrected by a calibration value, said temperature difference Dh being a consequence of the step of adding heat of a heat power value Ph to the fluid at said location;

calculating the heat power of a value Pd consumed by said region according to the expression:

$$Pd = Ph \times \frac{Dd}{Dh};$$

wherein the calibration value is obtained by interrupting the adding of said heat power of value Ph at said location and the step of finding a calibration temperature difference using the upstream temperature sensor and the downstream temperature sensor; and finding the calibration value as a function of the calibration temperature difference found between the temperature measured by upstream temperature sensor and the downstream temperature sensor during the interrupting step.

2. A method as claimed in claim 1, further comprising providing an insulation arrangement to heat insulate said paths from one another and from their surroundings.

3. A method as claimed in claim 1, in which said heat power of value Ph is added to the fluid in the input path.

4. A method as claimed in claim 1, in which said heat power of value Ph is added to the fluid in the output path.

5. A method as claimed in claim 1, further comprising integrating the calculated value Pd with respect to time to give the total heat power consumed by the region in a period of time.

6. A method of measuring heat power consumed in a region from heat delivered thereto by a heat containing fluid passing along an input path to said region, the fluid leaving from said region along an output path, the method comprising:

measuring a temperature of the fluid at a first position in the input path using a first temperature sensor and a temperature of the fluid at a second position in the output path using a second temperature sensor;

finding a temperature difference value Dd between a temperature of the fluid at the first position in said input path and the temperature of the fluid at the second position in the output path;

adding heat of a heat power value Ph to the fluid at a location in the input path;

measuring a temperature of the fluid adjacent to an upstream end of said location using a third temperature sensor and adjacent to a downstream end of said location using a fourth temperature sensor;

finding a temperature difference value Dh as a function of the temperature difference between the measured temperatures of the upstream and the downstream end of said location corrected by a calibration value, said temperature difference Dh being a consequence of the step of adding heat of a heat power value Ph to the fluid at said location;

calculating the heat power of a value Pd consumed by said region according to the expression:

$$Pd = Ph \times \frac{Dd}{Dh};$$

wherein the calibration value is obtained by interrupting the adding of said heat power of value Ph at said location and the step of finding a calibration temperature difference using the third temperature sensor and the fourth temperature sensor; and finding the calibration value as a function of the calibration temperature difference found between the temperature measured by the third temperature sensor and the fourth temperature sensor during the interrupting step.

7. A method as claimed in claim 6, further including the steps of stopping the supply of fluid from said input path to said region and diverting fluid from the input path into the output path upstream from the second position during the interruption of the adding of said heat and during the stopping and diversion at least one of the first temperature sensor and the second temperature sensor is further calibrated.

8. A method of measuring heat power consumed in a region from heat delivered thereto by a heat containing fluid passing along an input path to said region, the fluid leaving from said region along an output path, the method comprising:

measuring a temperature of the fluid at a first position in the output path using a first temperature sensor and a temperature of the fluid at a second position in the input path using a second temperature sensor;

finding a temperature difference value Dd between the temperature of the fluid at the first position in said output path and the temperature of the fluid at the second position in the input path;

adding heat with a heat power value Ph to the fluid at a location in the output path;

measuring a temperature of the fluid adjacent to an upstream end of said location using a third temperature sensor and adjacent to a downstream end of said location using a fourth temperature sensor;

finding a temperature difference value Dh as a function of the temperature difference between the measured temperatures of the upstream and the downstream end of said location corrected by a calibration value, said temperature difference Dh being a consequence of the step of adding heat of a heat power value Ph to the fluid at said location:

calculating the heat power of a value Pd consumed by said region according to the expression:

$$Pd = Ph \times \frac{Dd}{Dh};$$

wherein the calibration value is obtained by interrupting the adding of said heat power of value Ph at said location and the step of finding a calibration temperature difference using the third temperature sensor and the fourth temperature sensor; and finding the calibration value as a function of the calibration temperature difference found between the temperature measured by the third temperature sensor and the fourth temperature sensor during the interrupting step.

9. A method as claimed in claim 8, further including the steps of stopping the supply of fluid from said input path to said region and diverting fluid from the input path into the output path upstream from the first position during the interruption of the adding of said heat and during the stoppage and diversion at least one of the first temperature sensor and the second temperature sensor is further calibrated.

10. A method of measuring heat power consumed in a region from heat delivered thereto by a heat containing fluid passing along an input path to said region, the fluid leaving from said region along an output path, the method comprising:

measuring a temperature of the fluid at a first position in the input path using a first temperature sensor and a temperature of the fluid at a second position in the output path using a second temperature sensor;

finding a temperature difference value Dd between the temperature of the fluid at the first position in the input path and the temperature of the fluid at the second position in the output path;

adding heat of a heat power value Ph to the fluid at a heater location in said input path;

measuring a temperature of the fluid adjacent to an upstream end of said location using the first temperature sensor and adjacent to a downstream end of said location using a third temperature sensor; and a downstream end of said location;

finding a difference value Dh as a function of the temperature difference between the measured temperatures of the upstream and the downstream end of said location corrected by a calibration value, said temperature difference Dh being a consequence of the step of adding heat of a heat power value Ph to the fluid at said location;

calculating the heat power of a value Pd consumed by said region according to the expression:

$$Pd = Ph \times \frac{Dd}{Dh};$$

wherein the calibration value is obtained by interrupting the adding of said heat power of value Ph at said location and the step of finding a calibration temperature difference using the first temperature sensor and the third temperature sensor; and finding the calibration value as a function of the calibration temperature difference found between the temperature measured by the first temperature sensor and the third temperature sensor during the interrupting step.

11. A method as claimed in claim 10, further including the steps of stopping the supply of fluid from said input path to said region and diverting fluid from the input path into the output path upstream from the second position during the interruption of the adding of said heat and during the stoppage and diversion the second temperature sensor is further calibrated.

12. A method of measuring heat power consumed in a region from heat delivered thereto by a heat containing fluid passing along an input path to said region, the fluid leaving from said region along an output path, the method comprising:

measuring a temperature of the fluid at a first position in the output path using a first temperature sensor and a temperature of the fluid at a second position in the input path using a second temperature sensor;

finding a temperature difference value Dd between a temperature of the fluid at the first position in the output path and a temperature of the fluid at the second position in the input path;

adding heat of a heat power value Ph to the fluid at a heater location in said output path;

measuring a temperature of the fluid adjacent to an upstream end of said location using a third temperature sensor and adjacent to a downstream end of said location using the first temperature sensor;

finding a difference value Dh as a function of the temperature difference between the measured temperatures of the upstream and the downstream end of said location corrected by a calibration value, said temperature difference Dh being a consequence of the step of adding heat of a heat power value Ph to the fluid at said location;

calculating the heat power of a value Pd consumed by said region according to the expression:

$$Pd = Ph \times \frac{Dd}{Dh};$$

wherein the calibration value is obtained by interrupting the adding of said heat power of value Ph at said location and the step of finding a calibration temperature difference using the first temperature sensor and the third temperature sensor; and finding the calibration value as a function of the calibration temperature difference found between the temperature measured by the first temperature sensor and the third temperature sensor during the interrupting step.

13. A method as claimed in claim 12, further including the steps of stopping the supply of fluid from said input path to said region and diverting fluid from the input path into the output path upstream from the first position during the interruption of the adding of said heat and during the stoppage and diversion the second temperature sensor is further calibrated.

14. A heat meter to measure heat consumed in a region from heat delivered thereto by a heat containing fluid, said heat meter comprising:

an input path for passage of the fluid therealong into said region when the region is connected to said input path;

an output path for passage therealong of the fluid leaving said region when the region is connected to said output path;

a temperature difference determining arrangement determining a temperature difference value Dd between a temperature of the fluid at a first position on one of said paths and a temperature of the fluid at a second position in the other one of said paths;

a heater to add heat of a heat power value Ph to the fluid in one of said paths at a heater location which, with respect to the direction of the fluid flow in said paths and through the region when the paths are connected to the region, is downstream of one of said positions and upstream of the other of said positions;

a second temperature difference determining arrangement comprising an upstream temperature sensor and a downstream temperature sensor for determining a temperature difference value Dh as a function of the temperature difference between the measured temperature difference of the fluid adjacent to an upstream end and a downstream end of said heater location as corrected by a calibration value, which temperature difference Dh is a consequence of adding heat power of said value Ph to the fluid at said heater location, when the heat meter is in use; and a calculator to calculate the heat power Pd consumed by said region according to the expression:

$$Pd = Ph \times \frac{Dd}{Dh};$$

wherein said heater location is between the upstream fluid temperature sensor adjacent to said upstream end and the downstream fluid temperature sensor adjacent to said downstream end;

a control arrangement comprising said calculator and the control arrangement being arranged to interrupt the heater to stop adding heat to said fluid and to find a calibration temperature difference between temperatures measured by the upstream temperature sensor and the downstream temperature sensor during heater interruption; and a calibrator to calibrate at least one of the upstream temperature sensor and the downstream temperature sensor while the heater is interrupted by finding the calibration value as a function of the calibration temperature difference.

15. A heat meter as claimed in claim 14, in which an arrangement of insulation is provided to heat insulate externally the input path and the output path from one another and from the surroundings.

16. A heat meter as claimed in claim 14, in which the heater is an electric heater.

17. A heat meter as claimed in claim 16, in which the heater is a low power heater.

18. A heat meter as claimed in claim 14, in which the calculator means is arranged to integrate the calculated value Pd with respect to time to give the total heat power consumed by the region in a period of time.

19. A heat meter as claimed in claim 14, in which the input path has a corner around which the fluid must flow, and the heater is at said corner.

20. A heat meter as claimed in claim 14, in which the input path has a narrow portion, and the heater is at said narrow portion.

21. A heat meter as claimed in claim 20, in which the input path comprises a venturi, and the heater is at the throat of said venturi.

22. A heat meter to measure heat consumed in a region from heat delivered thereto by a heat containing fluid, said heat meter comprising:

an input path for passage of fluid there along into said region when the region is connected to said input path;

an output path for passage therealong of the fluid leaving said region when the region is connected to said output path;

a first temperature difference determining arrangement comprising a first temperature sensor provided to measure the fluid temperature at a first position in said input path, a second temperature sensor provided to measure the fluid temperature at a second position in said output path for determining a temperature difference value Dd between a temperature of the fluid at the first position and a temperature of the fluid at the second position;

a heater to add heat of a heat power value Ph to the fluid in said input path at a heater location which, with respect to the direction of the fluid flow in said paths and through the region when the paths are connected to the region, is downstream of one of said positions and upstream of the other of said positions;

a second temperature difference determining arrangement having third and fourth temperature sensors provided to measure the fluid temperature at third and fourth positions in said input path to determine a temperature difference value Dh as a function of the temperature difference between the measured temperature difference of the fluid adjacent to upstream and downstream ends of said heater location as corrected by a calibration value, which temperature difference Dh is a consequence of adding heat power of said value Ph to the fluid at said heater location when the heat meter is in use;

a calculator to calculate the heat power Pd consumed by said region according to the expression:

$$Pd = Ph \times \frac{Dd}{Dh};$$

a control arrangement including said calculator; and wherein the first temperature sensor is upstream of each of said third and fourth temperature sensors and the control arrangement interrupts the heater to stop the heater from adding heat to said fluid and calibrates at least one of the third temperature sensor and the fourth temperature sensor by finding the calibration value as a function of a calibration temperature difference measured by the third temperature sensor and the fourth temperature sensor while the heater is interrupted and adds no heat to the fluid.

23. A heat meter as claimed in claim 22, further comprising:

a flow path diverter to stop flow of the fluid to said region and divert flow of the fluid into said output path from the input path; and wherein said control arrangement is arranged to interrupt the heater adding heat to said fluid and to further calibrate at least one of the first temperature sensor and the second temperature sensor while the heater is interrupted.

24. A heat meter as claimed in claim 23, in which the flowpath diverter comprises a valve operable by the control arrangement.

25. A heat meter to measure heat consumed in a region from heat delivered thereto by a heat containing fluid, said heat meter comprising:

an input path for passage of the fluid therealong into said region when the region is connected to said input path;

an output path for passage therealong of the fluid leaving said region when the region is connected to said output path;

a first temperature difference determining arrangement comprising a first temperature sensor provided to measure the fluid temperature at a first position in said output path, a second temperature sensor provided to measure the fluid temperature at a second position in said input path for determining a temperature difference value Dd between a temperature of the fluid at the first position and a temperature of the fluid at the second position;

a heater to add heat of a heat power value Ph to the fluid at a heater location in the output path;

a second temperature difference determining arrangement having third and fourth temperature sensors provided at upstream and downstream ends of said heater location in said output path to determine a temperature difference value Dh as a function of the measured fluid temperature difference as corrected by a calibration value, which temperature difference Dh is a consequence of adding heat power of said value Ph to the fluid at heater location when the heat meter is in use;

a calculator to calculate the heat power Pd consumed by said region according to the expression:

$$Pd = Ph \times \frac{Dd}{Dh}; \text{ and}$$

a control arrangement including said calculator; and wherein said first temperature sensor is downstream of each of said third and fourth temperature sensors and said control arrangement interrupts the heater to stop the heater from adding heat to said fluid and calibrates at least one of the third temperature sensor and the fourth temperature sensor by finding the calibration value as a function of a calibration temperature difference measured by the third temperature sensor and the fourth temperature sensor while the heater is interrupted and adds no heat to the fluid.

26. A heat meter as claimed in claim 25, further comprising:

a flow path diverter to stop flow of the fluid to said region and divert flow of the fluid into said output path from the input path; and wherein said control arrangement interrupts the heater to stop the heater from adding heat to said fluid and to further calibrate at least one of the first temperature sensor and the second temperature sensor while the heater is interrupted and the flow is diverted.

27. A heat meter to measure heat consumed in a region from heat delivered thereto by a heat containing fluid, said heat meter comprising:

an input path for passage of the fluid therealong into said region when the region is connected to said input path;

an output path for passage therealong of the fluid leaving said region when the region is connected to said output path;

a first temperature difference determining arrangement comprising a first temperature sensor provided to measure the fluid temperature at a first position in said input path, said first position corresponding to one of the ends of a heater adding heat of a power value Ph to the fluid in the input path at a heater location in said input path, a second temperature sensor provided to measure the fluid temperature at a second position in said output path for determining a temperature difference value Dd between a temperature of the fluid at the first position and a temperature of the fluid at the second position;

a second temperature difference determining arrangement including the first temperature sensor measuring the fluid temperature at the first position corresponding to one of the ends of the heater and a third temperature sensor provided to measure the fluid temperature at a third position in the input path corresponding to the other end of the heater to determine a temperature difference value Dh as a function of the measured fluid temperature difference as corrected by a calibration value;

a calculator to calculate the heat power Pd consumed by said region according to the expression:

$$Pd = Ph \times \frac{Dd}{Dh};$$

a control arrangement including said calculator; and wherein said control arrangement interrupts the heater to stop the heater from adding heat to said fluid and calibrates at least one of the first temperature sensor and the third temperature sensor by finding the calibration value as a function of a calibration temperature difference measured by the first temperature sensor and the third temperature sensor while the heater is interrupted and adds no heat to the fluid.

28. A heat meter as claimed in claim 27, further comprising:

a flow path diverter to stop flow of the fluid to said region and divert flow of the fluid into said output path from the input path; and wherein said control arrangement is arranged to interupt the heater adding heat to said fluid and to further calibrate at least one of the first temperature sensor and the second temperature sensor while the heater is interupted and supplies no heat.

29. A heat meter to measure heat consumed in a region from heat delivered thereto by a heat containing fluid, said heat meter comprising:

an input path for passage of the fluid therealong into said region when the region is connected to said input path;

an output path for passage therealong of the fluid leaving said region when the region is connected to said output path;

a first temperature difference determining arrangement comprising a first temperature sensor provided to measure the fluid temperature at a first position in said output path, said first position corresponding to one of the ends of a heater adding heat of a power value Ph to the fluid in the output path at a heater location in said output path, a second temperature sensor provided to measure the fluid temperature at a second position in said input path for determining a temperature difference value Dd between a temperature of the fluid at the first position and a temperature of the fluid at the second position;

a second temperature difference determining arrangement including the first temperature sensor measuring the fluid temperature at the first position corresponding to one of the ends of the heater and a third temperature sensor provided to measure the fluid temperature at a third position in the output path corresponding to the other end of the heater to determine a temperature difference value Dh as a function of the measured fluid temperature difference as corrected by a calibration value;

a calculator to calculate the heat power Pd consumed by said region according to the expression:

$$Pd = Ph \times \frac{Dd}{Dh};$$

wherein said control arrangement interrupts the heater to stop the heater from adding heat to said fluid and calibrates at least one of the first temperature sensor and the third temperature sensor by finding the calibration value as a function of a calibration temperature difference measured by the first temperature sensor and the third temperature sensor while the heater is interrupted and adds no heat to the fluid.

30. A heat meter as claimed in claim 29, further comprising:

a flow path diverter to stop flow of the fluid to said region and divert flow of the fluid into said output path from the input path; and wherein said control arrangement is arranged to interrupt the heater adding heat to said fluid and to further calibrate at least one of the first temperature sensor and the second temperature sensor while the heater is interrupted and supplies no heat.

31. A heat meter as claimed in claim 30, wherein the flow path diverter comprises a valve operable by the control arrangement.

32. A method of measuring heat power extracted from a region by a fluid which is supplied to the region at such a temperature that the fluid extracts heat from the regions rather than delivering heat to said region, the method comprising:

providing an input path for passage of the fluid therealong into said region;

providing an output path for passage therealong of the fluid leaving said region;

measuring a temperature difference value Dd between a temperature of the fluid at a first position in one of said paths and a temperature of the fluid at a second position in the other of said paths;

adding heat of a heat power value Ph to the fluid at a location in one of said paths, said location being, with respect to a direction of fluid flow in said paths and through the region, downstream of one of said positions and upstream of the other of said positions;

measuring a temperature of the fluid adjacent to an upstream end of said location using an upstream temperature sensor and a downstream end of said location using a downstream temperature sensor;

finding a temperature difference value Dh as a function of the temperature difference between the measured temperatures of the upstream end and the downstream end of said location corrected by a calibration value, said temperature difference Dh being a consequence of the step of adding heat of a heat power value Ph to the fluid at said location;

calculating the heat power of a value Pd consumed by said region according to the expression:

$$Pd = Ph \times \frac{Dd}{Dh};$$

wherein the calibration value is obtained by interrupting the adding of said heat power of value Ph at said location and the step of finding a calibration temperature difference using the upstream temperature sensor and the downstream temperature sensor; and finding the calibration value as a function of the calibration temperature difference found between the temperature measured by upstream temperature sensor and the downstream temperature sensor during the interrupting step.

33. A heat meter to measure heat extracted from fluid which is supplied to a region at such a temperature that the fluid can extract heat from the region, said heat meter comprising:

an input path for passage of the fluid therealong into said region when the region is connected to said input path;

an output path for passage therealong of the fluid leaving said region when the region is connected to said output path;

a temperature difference determining arrangement determining a temperature difference value Dd between a temperature of the fluid at a first position in one of said paths and a temperature of the fluid at a second position in the other one of said paths;

a heater to add heat of a heat power value Ph to the fluid in one of said paths at a heater location which with respect to a direction of fluid flow in said paths and through the region when the paths are connected to the region, is downstream of one of said positions and upstream of the other of said positions;

a second temperature difference determining arrangement determining a temperature difference value DH between the temperature of the fluid adjacent to an upstream end and a downstream end of said heater location which temperature difference DH is a consequence of adding heat power of said value Ph to the fluid at said heater location, when the heat meter is in use; and a calculator to calculate the heat power Pd consumed by said region according to the expression:

$$Pd = Ph \times \frac{Dd}{Dh};$$

wherein said heater location is between an upstream fluid temperature sensor adjacent to said upstream end and a downstream fluid temperature sensor adjacent to said downstream end and said second temperature difference determining arrangement comprises said upstream temperature sensor and said downstream temperature sensor;

a control arrangement including said calculator, the control arrangement being arranged to interrupt the heater to stop adding heat to said fluid; and a calibrator to calibrate at least upstream temperature sensor or the downstream temperature sensor while the heater is interrupted.

* * * * *

UNITED STATES PATENT AND TRADEMARK OFFICE
CERTIFICATE OF CORRECTION

PATENT NO. : 5,902,043

DATED : May 11, 1999

INVENTOR(S) : Barry L. Price, et al.

It is certified that error appears in the above-identified patent and that said Letters Patent is hereby corrected as shown below:

Column 5, line 54, change "if" to --If--

Column 7, line 22, change "T*i*" to --T*o*--.

Signed and Sealed this

Tenth Day of April, 2001

Attest:

NICHOLAS P. GODICI

Attesting Officer

Acting Director of the United States Patent and Trademark Office